United States Patent
Noda (10) Patent No.: US 11,353,401 B2
(45) Date of Patent: Jun. 7, 2022

(54) SPECIMEN DETECTION DEVICE AND SPECIMEN DETECTION METHOD

(71) Applicant: Konica Minolta, Inc., Tokyo (JP)

(72) Inventor: Tetsuya Noda, Hino (JP)

(73) Assignee: OTSUKA PHARMACEUTICAL CO., LTD, Tokyo (JP)

( * ) Notice: Subject to any disclaimer, the term of this patent is extended or adjusted under 35 U.S.C. 154(b) by 78 days.

(21) Appl. No.: 16/615,028

(22) PCT Filed: Feb. 13, 2018

(86) PCT No.: PCT/JP2018/004792
§ 371 (c)(1),
(2) Date: Nov. 19, 2019

(87) PCT Pub. No.: WO2018/235332
PCT Pub. Date: Dec. 27, 2018

(65) Prior Publication Data
US 2020/0200680 A1  Jun. 25, 2020

(30) Foreign Application Priority Data

Jun. 23, 2017 (JP) .............................. JP2017-122954

(51) Int. Cl.
*G01N 21/64* (2006.01)
*B01L 3/00* (2006.01)
(Continued)

(52) U.S. Cl.
CPC .......... *G01N 21/6428* (2013.01); *B01L 3/508* (2013.01); *G01N 21/05* (2013.01);
(Continued)

(58) Field of Classification Search
CPC ............ G01N 21/6428; G01N 21/648; G01N 21/554; G01N 21/05; G01N 21/64;
(Continued)

(56) References Cited

U.S. PATENT DOCUMENTS

| 2007/0034792 A1* | 2/2007 | Zhang | ................ G01N 21/3504 |
| | | | 250/252.1 |
| 2007/0046778 A1* | 3/2007 | Ishihara | ............. G01N 21/6456 |
| | | | 348/68 |

(Continued)

FOREIGN PATENT DOCUMENTS

| JP | S62188920 A | 8/1987 |
| JP | 2011242161 A | 5/2010 |

(Continued)

OTHER PUBLICATIONS

Translation of JP2014119418A, Hakamata, Masashi, Jun. 30, 2014 (Year: 2014).*

(Continued)

*Primary Examiner* — Samuel P Siefke
*Assistant Examiner* — Henry H Nguyen
(74) *Attorney, Agent, or Firm* — Lucas & Mercanti, LLP (57) ABSTRACT

By irradiating a sensor chip including an analyte labeled with a fluorescent substance with excitation light from an excitation light irradiation unit for emitting the excitation light using a specimen detector including the excitation light irradiation unit and a fluorescence detection unit for detecting fluorescence, fluorescence emitted from the fluorescent substance is detected by the fluorescence detection unit. When the analyte is detected on the basis of a detection value depending on the intensity of the detected fluorescence, a corrected detection value is calculated by correcting the detection value using individual difference information acquired in advance on the basis of an individual difference between the specimen detectors and a correction coefficient for each sensor chip.

16 Claims, 5 Drawing Sheets

(51) Int. Cl.
*G01N 21/552* (2014.01)
*G01N 21/05* (2006.01)
*G01N 21/13* (2006.01)

(52) U.S. Cl.
CPC ........... *G01N 21/554* (2013.01); *G01N 21/64* (2013.01); *G01N 21/645* (2013.01); *G01N 21/648* (2013.01); *B01L 2300/0627* (2013.01); *B01L 2300/0681* (2013.01); *B01L 2300/0819* (2013.01); *B01L 2300/12* (2013.01); *G01N 21/13* (2013.01); *G01N 2021/6439* (2013.01); *G01N 2021/6471* (2013.01)

(58) Field of Classification Search
CPC ................. G01N 21/645; G01N 21/13; G01N 2021/6471; G01N 2021/6439; B01L 3/508; B01L 2300/0627; B01L 2300/0681; B01L 2300/0819; B01L 2300/12
See application file for complete search history.

(56) References Cited

U.S. PATENT DOCUMENTS

| | | | | |
|---|---|---|---|---|
| 2010/0312482 | A1* | 12/2010 | Nakada | G01N 21/6408 702/19 |
| 2011/0186753 | A1* | 8/2011 | Dixon | G01J 1/58 250/459.1 |
| 2011/0311245 | A1* | 12/2011 | Inada | G03G 15/0194 399/31 |
| 2013/0266480 | A1* | 10/2013 | Kimura | G01N 21/03 422/69 |
| 2014/0086646 | A1* | 3/2014 | Okuno | G03G 15/2028 399/323 |

FOREIGN PATENT DOCUMENTS

| | | |
|---|---|---|
| JP | 2010216982 A | 9/2010 |
| JP | 2012211811 A | 11/2012 |
| JP | 2014119418 A | 6/2014 |
| WO | 2012/111645 A1 | 8/2012 |
| WO | WO-2015129615 A1 * 9/2015 | ........... G01N 33/553 |

OTHER PUBLICATIONS

Translation of JPS62188920A, Sugiyama, Masami, Aug. 18, 1987 (Year: 1987).*
Translation of WO2015129615A1, Tamura, Tsuruki, Sep. 3, 2015 (Year: 2015).*
Translation of JP2011242161A, Miyata Kenichi, Jan. 12, 2011 (Year: 2011).*
PCT, International Search Report for the corresponding application No. PCT/JP2018/004792, dated Mar. 4, 2018, with English translation.
PCT, Written Opinion of the International Searching Authority for the corresponding application No. PCT/JP2018/004792, dated Mar. 4, 2018, with English translation.
EPO, Extended European Search Report for the corresponding European Patent Application No. 18820402.8, dated Jun. 8, 2020.
Resch-Genger U. et al., "Traceability in Fluorometry: Part II. Spectral Fluorescence Standards", Journal of Fluorescence, Kluwer Academic Publishers-Plenum Publishers, NE, vol. 15, No. 3, May 1, 2005, pp. 315-336.

* cited by examiner

SPECIMEN DETECTION DEVICE AND SPECIMEN DETECTION METHOD

CROSS REFERENCE TO RELATED APPLICATION

This Application is a 371 of PCT/JP2018/004792 filed on Feb. 13, 2018, which, in turn, claimed the priority of Japanese Patent Application No. 2017-122954 filed on Jun. 23, 2017, both applications are incorporated herein by reference.

TECHNICAL FIELD

The present invention relates to a specimen detection system and a specimen detection method for detecting a measurement target substance included in a sensor chip. More specifically, the present invention relates to a specimen detection system and a specimen detection method capable of detecting a measurement target substance with high accuracy regardless of an individual difference between optical systems included in a specimen detection device and the type of a fluorescent dye for labeling a measurement target substance.

BACKGROUND ART

Conventionally, in a case of detecting an extremely minute substance, various specimen detection methods capable of detecting such a substance by applying a physical phenomenon of the substance have been proposed.

As such a specimen detection method, for example, immunoassay is known which measures presence or absence of a measurement target substance and the amount thereof by using an antigen-antibody reaction between an antigen that is a measurement target substance contained in a sample liquid and an antibody or antigen labeled with a labeling substance.

Examples of immunoassay include enzyme immunoassay (EIA) using an enzyme as a labeling substance and fluorescence immunoassay (FIA) using a fluorescent substance as a labeling substance.

Examples of a specimen detection device using fluorescence immunoassay include a surface plasmon resonance device (hereinafter, referred to as "SPR device"), for example, for detecting an extremely minute analyte in a living body by applying a phenomenon (surface plasmon resonance (SPR) phenomenon) that obtains a high light output by resonance of electrons and light in a fine region at a nanometer level or the like.

In addition, a surface plasmon-field enhanced fluorescence spectroscopic device (hereinafter, also referred to as "SPFS device") capable of detecting an analyte with higher accuracy than the SPR device on the basis of principle of surface plasmon-field enhanced fluorescence spectroscopy (SPFS) applying a surface plasmon resonance (SPR) phenomenon is also one of such specimen detection devices.

In such an SPFS device, a sensor chip including a dielectric member, a metal film adjacent to an upper surface of the dielectric member, and a liquid holding member disposed on an upper surface of the metal film is used. In such a sensor chip, a reactor having a ligand for capturing an analyte is disposed on the metal film.

By supplying a sample liquid containing an analyte to the liquid holding member, the analyte is captured by the ligand (primary reaction). In this state, a liquid (labeling liquid) containing a secondary antibody labeled with a fluorescent substance is introduced into the liquid holding member. In the liquid holding member, the analyte captured by the ligand is labeled with the fluorescent substance by an antigen-antibody reaction (secondary reaction).

In this state, when the metal film is irradiated with excitation light at an angle at which surface plasmon resonance occurs through the dielectric member, the fluorescent substance is excited by surface plasmon light generated near a surface of the metal film, and fluorescence is generated from the fluorescent substance. By detecting this fluorescence, presence or absence of the analyte and the amount thereof can be measured.

By the way, in an optical specimen detection device, an excitation light wavelength, an incident angle, an immune reaction efficiency, and the like vary among the specimen detection devices due to variations in parts used and assembly variations. An individual difference between specimen detection devices occur due to these various factors.

In particular, due to an individual difference between laser diodes that are excitation light projecting means, an individual difference between band-pass filters for blocking excitation light and transmitting fluorescence, and the like, different measurement results are obtained even for the same sample.

For this reason, conventionally, an immune reaction and optical measurement are performed using a reagent with a known concentration, and calibration work for storing a "correction coefficient" in a specimen detection device such that a correct value is calculated is performed for each specimen detection device. As a result, an individual difference between specimen detection devices is reduced.

For example, in Patent Literature 1, a correction coefficient of a device individual difference according to the type of a measurement target substance is stored in advance in a storage means of a specimen detection device, identification information regarding the type of a measurement target substance is acquired from a sensor chip, and the device individual difference is corrected by correcting a fluorescence signal obtained by irradiating the sensor chip with excitation light using the correction coefficient extracted from the storage means according to the identification information.

CITATION LIST

Patent Literature

Patent Literature 1: JP 2014-119418 A

SUMMARY OF INVENTION

Technical Problem

In specimen detection work, it may be required to perform a plurality of tests in parallel and to quickly obtain a large number of test results. For this reason, it is conceivable to perform a plurality of tests simultaneously using a plurality of specimen test devices in combination or using one specimen test device having a plurality of specimen detection units mounted on thereon.

In this case, the calibration work described above needs to be performed for each of specimen detection devices (each of specimen detection units) because there is an individual difference between the specimen detection devices (specimen detection units) in general. For this reason, in the specimen detection device using a plurality of specimen detection devices in combination or having a plurality of specimen detection units mounted thereon, calibration work needs to be performed for each of the specimen detection devices or each of the specimen detection units.

In addition, since calibration work needs to be performed for each of test items (each of measurement target substances), performing calibration work for each of test items for each of specimen detection devices (each of specimen detection units) is a very heavy burden on a user.

An object of the present invention is to provide a specimen detection device and a specimen detection method capable of reducing an individual difference between specimen detection units without performing calibration work for all specimen detection units for a plurality of specimen detection devices or a specimen detection device having a plurality of specimen detection units mounted thereon.

As a result, it is possible to reduce a burden of calibration work on a user using a plurality of specimen detection devices or a specimen detection device having a plurality of specimen detection units mounted thereon.

In addition, an object of the present invention is to provide a specimen detection device and a specimen detection method which do not need to perform new calibration work for a newly added specimen detection unit even if the specimen detection unit is newly added to a specimen detection device on which a plurality of specimen detection units can be mounted, and which are light work burdens on a user or a device assembly worker.

Furthermore, an object of the present invention is to provide a specimen detection device and a specimen detection method capable of reducing an individual difference between specimen detection units by a simple method even when a new test item is added.

Solution to Problem

The present invention has been achieved in order to solve the above-described problems in related art. In order to achieve at least one of the above-described objects, a specimen detection device reflecting one aspect of the present invention is a specimen detection device for detecting an analyte labeled with a fluorescent substance on the basis of the intensity of fluorescence emitted from the fluorescent substance by irradiating a sensor chip including the analyte with excitation light, the specimen detection device including:

a specimen detector including an excitation light irradiation unit for emitting the excitation light and a fluorescence detection unit for detecting the fluorescence; and a controller for detecting the analyte on the basis of a detection value depending on the intensity of the fluorescence detected by the fluorescence detection unit, in which the controller corrects the detection value using individual difference information stored in advance on the basis of an individual difference between the specimen detectors and a correction coefficient for the each sensor chip, and calculates a corrected detection value.

A specimen detection method reflecting one aspect of the present invention is a specimen detection method for detecting fluorescence emitted from a fluorescent substance by a fluorescence detection unit for detecting fluorescence by irradiating a sensor chip including an analyte labeled with the fluorescent substance with excitation light from an excitation light irradiation unit for emitting the excitation light using a specimen detector including the excitation light irradiation unit and the fluorescence detection unit, and detecting the analyte on the basis of a detection value depending on the intensity of the detected fluorescence, in which a corrected detection value is calculated by correcting the detection value using individual difference information acquired in advance on the basis of an individual difference between the specimen detectors and a correction coefficient for the each sensor chip.

Advantageous Effects of Invention

According to the present invention, a correction value is calculated for each of specimen detection devices to reduce an individual difference therebetween on the basis of individual difference information differing not depending on a measurement target substance but depending on an optical system of a specimen detection device, and fluorescent substance information differing not depending on an optical system of a specimen detection device but depending on a fluorescent substance for labelling a measurement target substance. Therefore, it is not necessary to perform calibration work for each of test items (each of measurement target substances) for all specimen detection devices (specimen detection units) to acquire a correction value, thus reducing labor of a user's calibration work.

Furthermore, according to the present invention, even when a specimen detection device (specimen detection unit) is newly added, it is not necessary to perform new calibration work for the newly added specimen detection device (specimen detection unit), thus reducing a work burden on a user or a device assembly worker.

Furthermore, according to the present invention, even when the specimen detection device is made to correspond to a new test item, by providing only the fluorescent substance information of the fluorescent substance used in the new test item, a correction value is calculated for each of specimen detection devices to reduce an individual difference therebetween. Therefore, it is not necessary to store the correction value newly in the specimen detection device. As a result, it is possible to correspond to a new test item without a burden on a user.

DESCRIPTION OF EMBODIMENTS

Hereinafter, an embodiment of the present invention will be described in more detail on the basis of the drawings.

Figure 1:
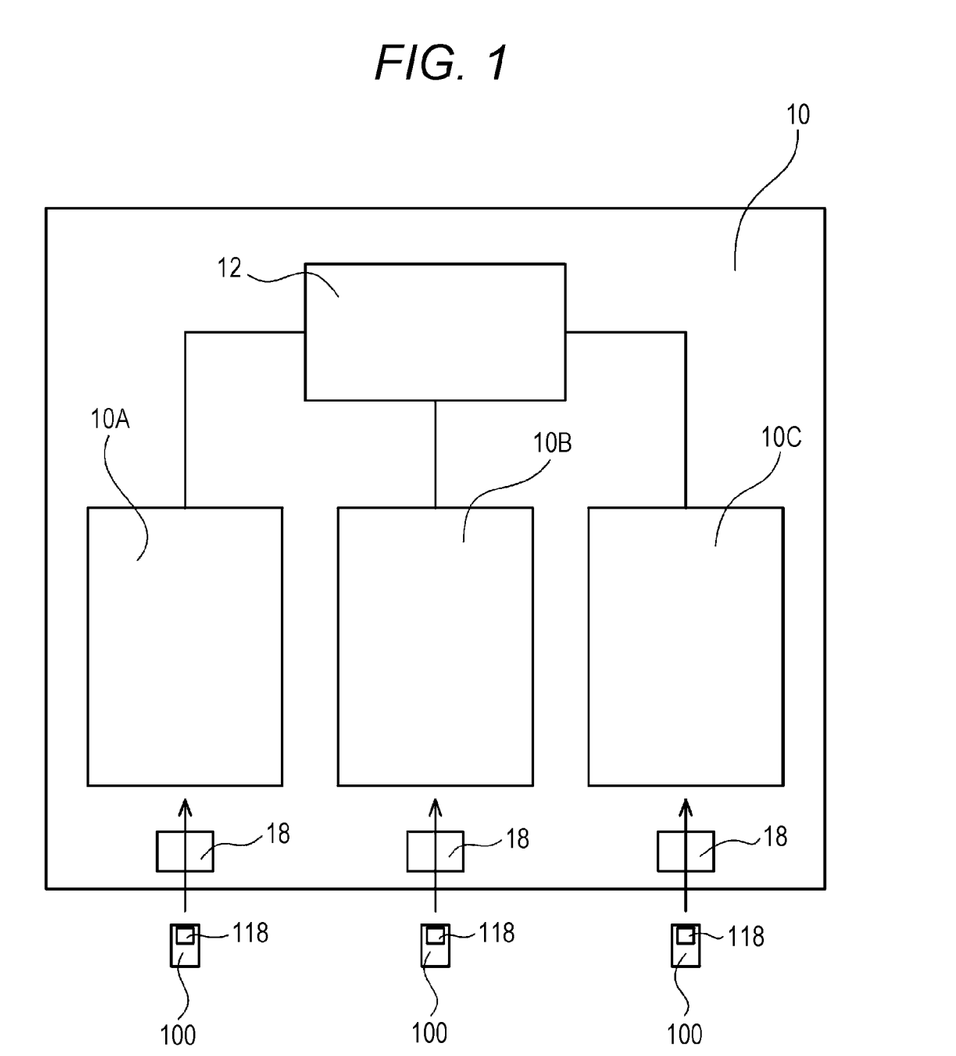
FIG. 1 is a schematic diagram for explaining a configuration of a surface plasmon-field enhanced fluorescence spectroscopic device (SPFS device) which is a specimen detection device according to an embodiment of the present invention.
Figure 2:
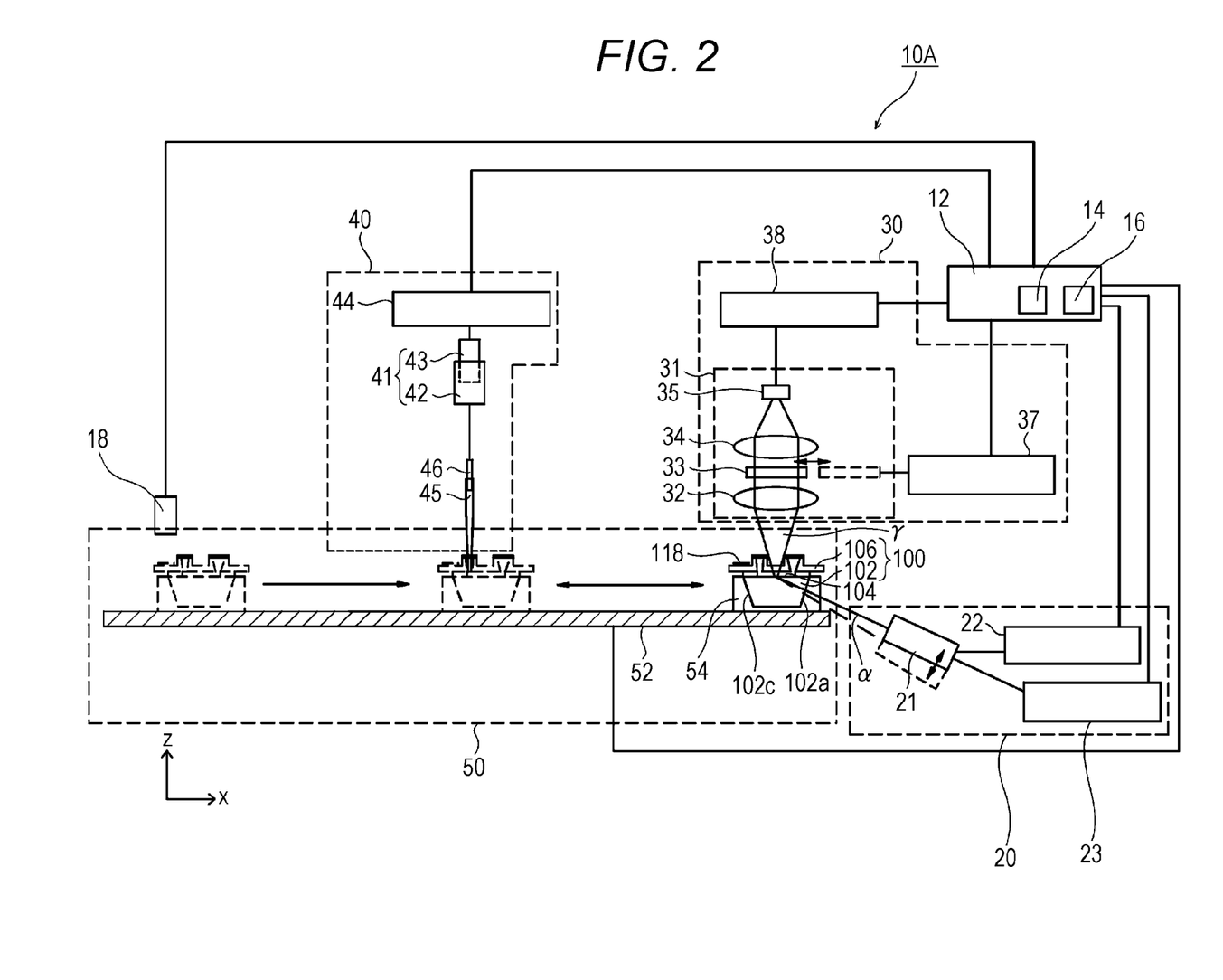
FIG. 2 is a schematic diagram for explaining a configuration of a specimen detector in the SPFS device of FIG. 1.
Figure 3:
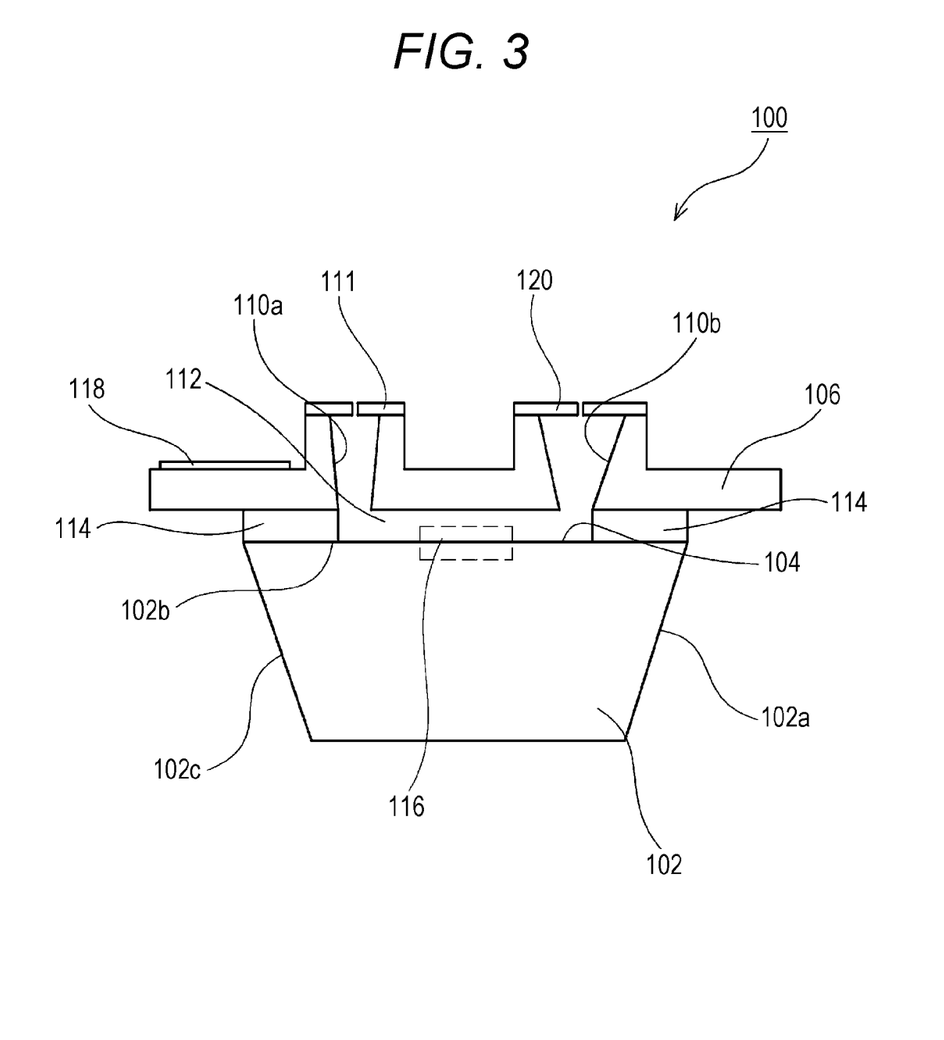
FIG. 3 is a schematic diagram for explaining a configuration of a sensor chip used in the specimen detector of FIG. 2.

FIG. 1 is a schematic diagram for explaining a configuration of a surface plasmon-field enhanced fluorescence spectroscopic device (SPFS device) which is a specimen detection device according to an embodiment of the present invention. FIG. 2 is a schematic diagram for explaining a configuration of a specimen detector in the SPFS device of FIG. 1. FIG. 3 is a schematic diagram for explaining a configuration of a sensor chip used in the specimen detector of FIG. 2.

As illustrated in FIGS. 1 and 2, an SPFS device 10 according to the present embodiment includes a plurality of specimen detectors 10A, 10B, and 10C, a controller 12 for detecting a specimen on the basis of detection values obtained by the specimen detectors 10A, 10B, and 10C, and an identification information acquisitor 18 for acquiring information stored in an identification information storage 118 disposed in a sensor chip 100 described later.

Each of the specimen detectors 10A, 10B, and 10C includes an excitation light irradiation unit 20, a fluorescence detection unit 30, a liquid feeding unit 40, and a conveying unit 50 as illustrated in FIG. 2. Note that each of the specimen detectors 10A, 10B, and 10C is used with the sensor chip 100 attached to a chip holder 54 of the conveying unit 50.

As illustrated in FIG. 3, the sensor chip 100 includes a dielectric member 102 having an incident surface 102a, a film formation surface 102b, and an emission surface 102c, a metal film 104 formed on the film formation surface 102b, and a flow path forming member 106 fixed onto the film formation surface 102b or the metal film 104. Usually, the sensor chip 100 is replaced for each specimen test.

The sensor chip 100 is a structure preferably having each side of several mm to several cm, but may be a smaller or larger structure not included in a category of the "chip".

The dielectric member 102 can be a prism formed of a dielectric transparent to excitation light α. The incident surface 102a of the dielectric member 102 is a surface on which the excitation light α emitted from the excitation light irradiation unit 20 enters the dielectric member 102. The metal film 104 is formed on the film formation surface 102b. The excitation light α that has entered the dielectric member 102 is reflected at an interface between the metal film 104 and the film formation surface 102b of the dielectric member 102 (hereinafter, referred to as "back surface of the metal film 104" for convenience), and the excitation light α is emitted to the outside of the dielectric member 102 through the emission surface 102c.

The shape of the dielectric member 102 is not particularly limited, and the dielectric member 102 illustrated in FIG. 2 is a prism formed of a hexahedron having a substantially trapezoidal vertical cross-sectional shape (truncated quadrangular pyramid shape). However, the vertical cross-sectional shape may be a triangle (so-called triangular prism), a semicircular shape, or a semielliptical shape.

The incident surface 102a is formed such that the excitation light α does not return to the excitation light irradiation unit 20. When a light source of the excitation light α is, for example, a laser diode (hereinafter, also referred to as "LD"), return of the excitation light α to the LD disturbs an excitation state of the LD, and causes a wavelength of the excitation light α or an output thereof to fluctuate. Therefore, the angle of the incident surface 102a is set such that the excitation light α is not vertically incident on the incident surface 102a in a scanning range around an ideal enhancement angle.

Note that design of the sensor chip 100 generally determines a resonance angle (and an enhancement angle extremely close thereto). Examples of a design element include the refractive index of the dielectric member 102, the refractive index of the metal film 104, the film thickness of the metal film 104, the extinction coefficient of the metal film 104, and the wavelength of the excitation light α. The resonance angle and the enhancement angle are shifted by an analyte fixed on the metal film 104, but the amount thereof is less than a few degrees.

The dielectric member 102 has not a little birefringence characteristic. Examples of a material of the dielectric member 102 include various inorganic materials such as glass and ceramics, a natural polymer, and a synthetic polymer. A material having excellent chemical stability, manufacturing stability, optical transparency, and low birefringence is preferable.

The material of the dielectric member 102 is not particularly limited as described above as long as being formed of a material that is at least optically transparent to the excitation light α and has low birefringence. However, in providing the sensor chip 100 that is inexpensive and has excellent handleability, for example, the dielectric member 102 is preferably formed of a resin material. Note that a method for manufacturing the dielectric member 102 is not particularly limited, but injection molding using a die is preferable from a viewpoint of manufacturing cost.

When the dielectric member 102 is formed of a resin material, examples of the resin material include a polyolefin such as polyethylene (PE) or polypropylene (PP), a polycyclic olefin such as a cyclic olefin copolymer (COC) or a cyclic olefin polymer (COP), polystyrene, polycarbonate (PC), an acrylic resin, and triacetyl cellulose (TAC).

The metal film 104 is formed on the film formation surface 102b of the dielectric member 102. As a result, an interaction (surface plasmon resonance) occurs between a photon of the excitation light α incident on the film formation surface 102b under a total reflection condition and a free electron in the metal film 104, and localized field light can be generated on a surface of the metal film 104.

A material of the metal film 104 is not particularly limited as long as being a metal capable of causing surface plasmon resonance. For example, the metal film 104 is formed of at least one metal selected from the group consisting of gold, silver, aluminum, copper, and platinum, more preferably formed of gold, and furthermore, may be formed of an alloy of these metals. Such a metal is suitable for the metal film 104 because of being stable to oxidation and increasing electric field enhancement due to surface plasmon light.

A method for forming the metal film 104 is not particularly limited, and examples thereof include a sputtering method, a vapor deposition method (a resistance heating vapor deposition method, an electron beam vapor deposition method, or the like), electrolytic plating, and an electroless plating method. A sputtering method or a vapor deposition method is preferably used in view of easiness in adjustment of metal film forming conditions.

The thickness of the metal film 104 is not particularly limited, but is preferably within a range of 5 to 500 nm, and more preferably within a range of 20 to 70 nm in a case of gold, silver, copper, or platinum, within a range of 10 to 50 nm in a case of aluminum, and within a range of 10 to 70 nm in a case of an alloy of these metals from a viewpoint of an electric field enhancing effect.

The thickness of the metal film 104 within the above range is preferable because surface plasmon light is easily generated. The dimensions of the size (length×width) of the metal film 104 and the shape thereof are not particularly limited as long as the metal film 104 has such a thickness.

Although not illustrated in FIGS. 1 to 3, a ligand for capturing an analyte is fixed on a surface of the metal film 104 not facing the dielectric member 102 (hereinafter, referred to as "surface of the metal film 104" for convenience). By fixing the ligand, an analyte can be detected selectively.

In the present embodiment, the ligand is uniformly fixed in a predetermined region (reaction field 116) on the metal film 104. The type of the ligand is not particularly limited as long as being able to capture an analyte. In the present embodiment, the ligand is an antibody specific to an analyte or a fragment thereof.

The flow path forming member 106 is disposed on the film formation surface 102b of the dielectric member 102 or the metal film 104, as illustrated in FIG. 3. In the present embodiment, the flow path forming member 106 is bonded to the dielectric member 102 or the metal film 104 by an adhesive sheet (flow path seal 114) in which a through hole is formed, and a space surrounded by the dielectric member 102, the flow path forming member 106, and the flow path seal 114, that is, the through hole of the flow path seal 114 is used as a flow path 112.

The flow path forming member 106 is not limited thereto. For example, by forming a flow path groove on the film formation surface 102b or a surface facing the metal film 104 and disposing the flow path forming member 106 so as to cover the reaction field 116 on the metal film 104, a space surrounded by the flow path forming member 106 and the dielectric member 102, that is, the flow path groove can be used as the flow path 112 for feeding a sample liquid, a labeling liquid, a cleaning liquid, and the like.

In this case, the flow path forming member 106 can be bonded to the dielectric member 102 or the metal film 104 by, for example, adhesion using an adhesive or a transparent adhesive sheet, laser welding, ultrasonic welding, or pressure bonding using a clamp member.

The flow path 112 formed in this way preferably has a width of 0.1 mm to 5 mm and a length of 10 mm to 50 mm. The flow path 112 preferably has a height of 50 µm to 500 µm in the vicinity of a first through hole 110a.

The flow path forming member 106 includes the first through hole 110a formed at one end of the flow path 112 and a second through hole 110b formed at the other end of the flow path 112. In the present embodiment, each of the first through hole 110a and the second through hole 110b has a substantially cylindrical shape. The first through hole 110a and the second through hole 110b function as inlets for injecting a sample liquid, a labeling liquid, a cleaning liquid, or the like into the flow path 112, and outlets for taking out the sample liquid, the labeling liquid, the cleaning liquid, or the like.

A material of the flow path forming member 106 is not particularly limited as long as being formed of a material optically transparent at least with respect to fluorescence γ described later. However, in providing the sensor chip 100 that is inexpensive and has excellent handleability, for example, the flow path forming member 106 is preferably formed of a resin material. Note that a method for manufacturing the flow path forming member 106 is not particularly limited, but injection molding using a die is preferable from a viewpoint of manufacturing cost.

When the flow path forming member 106 is formed of a resin material, examples of the resin material include a polyester such as polyethylene terephthalate (PET) or polyethylene naphthalate, a polyolefin such as polyethylene (PE) or polypropylene (PP), a polycyclic olefin such as a cyclic olefin copolymer (COC) or a cyclic olefin polymer (COP), a vinyl-based resin such as polyvinyl chloride or polyvinylidene chloride, polystyrene, polyetheretherketone (PEEK), polysulfone (PSF), polyethersulfone (PES), polycarbonate (PC), polyamide, polyimide, an acrylic resin, and triacetylcellulose (TAC).

The identification information storage 118 is disposed in the sensor chip 100 at a position that does not block the excitation light α or the fluorescence γ described later. The identification information storage 118 stores identification information for specifying a correction coefficient for each sensor chip 100, such as information for specifying a test item, information for specifying a fluorescent substance used in the sensor chip 100, or fluorescent substance information described later. As the identification information storage 118, for example, a bar code, a two-dimensional code, or a radio frequency identifier (RFID) may be used, and information regarding a test item or a fluorescent substance can be described as characters.

As illustrated in FIG. 2, the sensor chip 100 configured as described above is attached to the chip holder 54 of the conveying unit 50 of the SPFS device 10, and a specimen is detected by each of the specimen detectors 10A, 10B, and 10C.

The identification information acquisitor 18 acquires identification information stored in the identification information storage 118 of the sensor chip 100 and stores the identification information in the controller 12. The identification information acquisitor 18 can be appropriately selected according to the form of the identification information storage 118, and can be, for example, a barcode reader, a two-dimensional code reader, or an RFID reader, or can also be a keyboard or a mouse to which a user directly inputs information.

Next, components of each of the specimen detectors 10A, 10B, and 10C will be described on the basis of FIG. 2. Note that the specimen detectors 10A, 10B, and 10C have basically the same configuration, and therefore only the configuration of the specimen detector 10A will be described in FIG. 2.

As described above, the specimen detector 10A in the present embodiment includes the excitation light irradiation unit 20, the fluorescence detection unit 30, the liquid feeding unit 40, and the conveying unit 50.

The excitation light irradiation unit 20 irradiates the sensor chip 100 held by the chip holder 54 with the excitation light α. As described later, when the fluorescence γ is measured, the excitation light irradiation unit 20 emits only P-wave with respect to the metal film 104 toward the incident surface 102a such that an incident angle thereof with respect to the metal film 104 becomes an angle to cause surface plasmon resonance.

Here, the "excitation light" is light to excite a fluorescent substance directly or indirectly. For example, the excitation light α is light to generate localized field light to excite a fluorescent substance on a surface of the metal film 104 when the metal film 104 is irradiated with the excitation light α through the dielectric member 102 at an angle at which surface plasmon resonance occurs.

The excitation light irradiation unit 20 includes a configuration for emitting the excitation light α toward the dielectric member 102 and a configuration for scanning for the incident angle of the excitation light α with respect to the back surface of the metal film 104. In the present embodiment, the excitation light irradiation unit 20 includes a light source unit 21, an angle adjusting mechanism 22, and a light source controller 23.

The light source unit 21 emits the collimated excitation light α having a constant wavelength and light quantity such that an irradiation spot on the back surface of the metal film 104 has a substantially circular shape. The light source unit 21 includes, for example, a light source of the excitation light α, a beam shaping optical system, an automatic power-control (APC) mechanism, and a temperature adjusting mechanism (none of which are illustrated).

The type of the light source is not particularly limited, and examples thereof include a laser diode (LD), a light emitting diode, a mercury lamp, and other laser light sources. When light emitted from the light source is not a beam, the light emitted from the light source is converted into a beam by a lens, a mirror, a slit, or the like. When light emitted from the light source is not monochromatic light, the light emitted from the light source is converted into monochromatic light by a diffraction grating or the like. When light emitted from the light source is not linearly polarized light, the light emitted from the light source is converted into linearly polarized light by a polarizer or the like.

For example, the beam shaping optical system includes a collimator, a bandpass filter, a linearly polarizing filter, a half-wave plate, a slit, and a zooming means. The beam shaping optical system may include all or some of these.

The collimator collimates the excitation light α emitted from the light source. The bandpass filter converts the excitation light α emitted from the light source into narrow band light having only a center wavelength. This is because the excitation light α from the light source has a small wavelength distribution width.

The linearly polarizing filter converts the excitation light α emitted from the light source into completely linearly polarized light. The half-wave plate adjusts a polarization direction of the excitation light α such that a P-wave component is incident on the metal film 104. The slit and zooming means adjust a beam diameter of the excitation light α and a contour shape thereof such that the irradiation spot on the back surface of the metal film 104 has a circular shape having a predetermined size.

The APC mechanism controls the light source such that an output of the light source is constant. More specifically, the APC mechanism detects the light quantity of light branching from the excitation light α with a photodiode (not illustrated) or the like. The APC mechanism controls an output of the light source constantly by controlling input energy in a regression circuit.

Examples of the temperature adjusting mechanism include a heater and a Peltier element. A wavelength and energy of light emitted from the light source may vary according to a temperature. Therefore, by keeping the temperature of the light source constantly by the temperature adjusting mechanism, the wavelength and energy of light emitted from the light source is controlled constantly.

The angle adjusting mechanism 22 adjusts the incident angle of the excitation light α on the metal film 104. The angle adjusting mechanism 22 rotates an optical axis of the excitation light α and the chip holder 54 relatively in order to emit the excitation light α toward a predetermined position of the metal film 104 through the dielectric member 102 at a predetermined incident angle.

For example, the angle adjusting mechanism 22 rotates the light source unit 21 around an axis (axis perpendicular to paper face of FIG. 2) perpendicular to the optical axis of the excitation light α. At this time, the position of the rotational axis is set such that the position of an irradiation spot on the metal film 104 is hardly changed even when scanning for an incident angle is performed. By setting the position of the rotation center to the vicinity of an intersection of the two optical axes of the excitation light α at both ends of a scanning range for an incident angle (between the irradiation position on the film formation surface 102b and the incident surface 102a), deviation of the irradiation position can be minimized.

Among incident angles of the excitation light α with respect to the metal film 104, an angle at which the maximum light quantity of plasmon scattered light is obtained is an enhancement angle. By setting an incident angle of the excitation light α to the enhancement angle or an angle in the vicinity thereof, the fluorescence γ having a high intensity can be measured.

Note that basic incident conditions of the excitation light α are determined by the material of the dielectric member 102 of the sensor chip 100 and the shape thereof, the film thickness of the metal film 104, a refractive index of a sample liquid in the flow path 112, and the like. However, an optimum incident condition is varied slightly according to the type of an analyte in the flow path 112, the amount thereof, a shape error of the dielectric member 102, and the like. Therefore, an optimum enhancement angle is preferably determined for each specimen test.

The light source controller 23 controls various devices included in the light source unit 21 to control emission of the excitation light α from the light source unit 21. For example, the light source controller 23 is constituted by a known computer or microcomputer including a computing device, a control device, a storage device, an input device, and an output device.

The fluorescence detection unit 30 detects the fluorescence γ generated from a fluorescent substance excited by irradiation to the metal film 104 with the excitation light α. In addition, the fluorescence detection unit 30 also detects plasmon scattered light generated by irradiation to the metal film 104 with the excitation light α as necessary. The fluorescence detection unit 30 includes, for example, a light receiving unit 31, a position switching mechanism 37, and a sensor controller 38.

The light receiving unit 31 is disposed in a normal direction (z-axis direction in FIG. 2) of the metal film 104 of the sensor chip 100. The light receiving unit 31 includes a first lens 32, an optical filter 33, a second lens 34, and a light receiving sensor 35.

For example, the first lens 32 is a condenser lens, and condenses light emitted from an upper surface of the metal film 104. For example, the second lens 34 is an imaging lens, and images the light condensed by the first lens 32 on a light receiving surface of the light receiving sensor 35. Optical paths between the two lenses 32 and 34 are substantially parallel to each other. The optical filter 33 is disposed between the two lenses 32 and 34.

The optical filter 33 leads only a fluorescence component to the light receiving sensor 35, and removes an excitation light component (plasmon scattered light) in order to detect the fluorescence γ at a high S/N ratio. Examples of the optical filter 33 include an excitation light reflection filter, a short wavelength cut filter, and a bandpass filter. For example, the optical filter 33 is a filter including a multilayer film for reflecting a predetermined light component, but may be a colored glass filter for absorbing a predetermined light component.

The light receiving sensor 35 detects the fluorescence γ. The light receiving sensor 35 is not particularly limited as long as having high sensitivity so as to be able to detect the weak fluorescence γ from a fluorescent substance labeled with a very small amount of analyte, but may be, for example, a photomultiplier (PMT), an avalanche photodiode (APD), or a low noise photodiode (PD).

The position switching mechanism 37 switches the position of the optical filter 33 between a position on an optical path and a position outside the optical path in the light receiving unit 31. Specifically, the optical filter 33 is disposed on the optical path of the light receiving unit 31 when the light receiving sensor 35 detects the fluorescence γ, and the optical filter 33 is disposed outside the optical path of the light receiving unit 31 when the light receiving sensor 35 detects plasmon scattered light. The position switching mechanism 37 includes, for example, a rotation drive unit and a known mechanism (such as a turntable or a rack and pinion) for moving the optical filter 33 in the horizontal direction by using a rotational motion.

The sensor controller 38 controls detection of an output value of the light receiving sensor 35, management of the sensitivity of the light receiving sensor 35 with the detected output value, change of the sensitivity of the light receiving sensor 35 for obtaining a proper output value, and the like. For example, the sensor controller 38 is constituted by a known computer or microcomputer including a computing device, a control device, a storage device, an input device, and an output device.

The liquid feeding unit 40 supplies a sample liquid, a labeling liquid, a cleaning liquid, and the like into the flow path 112 of the sensor chip 100 attached to the chip holder 54. The liquid feeding unit 40 includes a syringe pump 41, a pipette nozzle 46, a pipette tip 45, and a liquid feeding pump drive mechanism 44.

The liquid feeding unit 40 is used with the pipette tip 45 attached to a tip of the pipette nozzle 46. If the pipette tip 45 can be replaced, it is not necessary to clean the pipette tip 45, and contamination of impurities can be prevented.

The syringe pump 41 is constituted by a syringe 42 and a plunger 43 capable of being reciprocated in the syringe 42. By the reciprocating motion of the plunger 43, suction of a liquid and discharge thereof are performed quantitatively.

The liquid feeding pump drive mechanism 44 includes a device for driving the syringe pump 41 and a device for moving the pipette nozzle 46 to which the pipette tip 45 is attached. The device for driving the syringe pump 41 is a device for reciprocating the plunger 43, and for example, includes a stepping motor. A driving device including a stepping motor can manage a liquid feeding amount of the syringe pump 41 and a liquid feeding rate thereof, and is therefore preferable from a viewpoint of managing the amount of a remaining liquid in the sensor chip 100. For example, the device for moving the pipette nozzle 46 freely moves the pipette nozzle 46 in two directions of an axial direction of the pipette nozzle 46 (for example, vertical direction) and a direction crossing the axial direction (for example, horizontal direction). For example, the device for moving the pipette nozzle 46 is constituted by a robot arm, a 2-axis stage, or a vertically movable turntable.

The liquid feeding unit 40 preferably further includes a mechanism for detecting the position of a tip of the pipette tip 45 from a viewpoint of adjusting a relative height between the pipette tip 45 and the sensor chip 100 to be constant and managing the amount of a remaining liquid in the sensor chip 100 to be constant.

The liquid feeding unit 40 sucks various liquids from a liquid reservoir (not illustrated) and supplies the various liquids into the flow path 112 of the sensor chip 100. At this time, by moving the plunger 43, a liquid is reciprocated in the flow path 112 of the sensor chip 100, and the liquid in the flow path 112 is stirred. This can make the concentration of the liquid uniform, or can accelerate a reaction in the flow path 112 (for example, an antigen-antibody reaction), for example.

Since such an operation is performed, the inlet (first through hole 110a) of the sensor chip 100 is preferably protected by a multilayer film 111 and the like, and the sensor chip 100 and the pipette tip 45 are preferably configured such that the first through hole 110a can be sealed when the pipette tip 45 penetrates the multilayer film.

Meanwhile, the second through hole 110b has a lid seal 120 covering an upper opening thereof, and serves as a reservoir for temporarily storing an injected liquid after the liquid passes through the flow path. Note that the lid seal 120 has a minute hole for air removal.

A liquid in the flow path 112 is again sucked by the syringe pump 41 and discharged to a waste liquid portion (not illustrated) or the like. By repeating these operations, a reaction of various liquids, cleaning, and the like are performed, and an analyte labeled with a fluorescent substance can be fixed to a reaction field in the flow path 112.

The conveying unit 50 conveys and fixes the sensor chip 100 attached to the chip holder 54 by a user to a liquid feeding position or a measurement position. Here, the "liquid feeding position" is a position where the liquid feeding unit 40 supplies a liquid into the flow path 112 of the sensor chip 100 or removes the liquid in the flow path 112. The "measurement position" is a position where the excitation light irradiation unit 20 irradiates the sensor chip 100 with the excitation light α, and the fluorescence detection unit 30 detects the fluorescence γ generated thereby.

The conveying unit 50 includes a conveying stage 52 and the chip holder 54. The chip holder 54 is fixed to the conveying stage 52 and holds the sensor chip 100 detachably. The shape of the chip holder 54 is not particularly limited as long as being able to hold the sensor chip 100 and not blocking optical paths of the excitation light α and the fluorescence γ. For example, the chip holder 54 has an opening through which the excitation light α and the fluorescence γ pass.

The conveying stage 52 is configured to be able to move the chip holder 54 in one direction (x-axis direction in FIG. 2) and in the opposite direction thereto. For example, the conveying stage 52 is driven by a stepping motor.

Each of the specimen detectors 10A, 10B, and 10C configured as described above is connected to the controller 12. The controller 12 controls the angle adjusting mechanism 22, the light source controller 23, the position switching mechanism 37, the sensor controller 38, and the conveying stage 52, detects an analyte on the basis of a detection value depending on the intensity of the fluorescence γ detected by the fluorescence detection unit 30, and calculates the amount of the analyte and the concentration hereof as necessary. For example, the controller 12 is constituted by a known computer or microcomputer including a computing device, a control device, a storage device, an input device, and an output device.

Note that the detection value may be a value obtained by digitizing the intensity of the fluorescent γ or a numerical value obtained by normalizing the intensity of the fluorescent γ.

Figure 4:
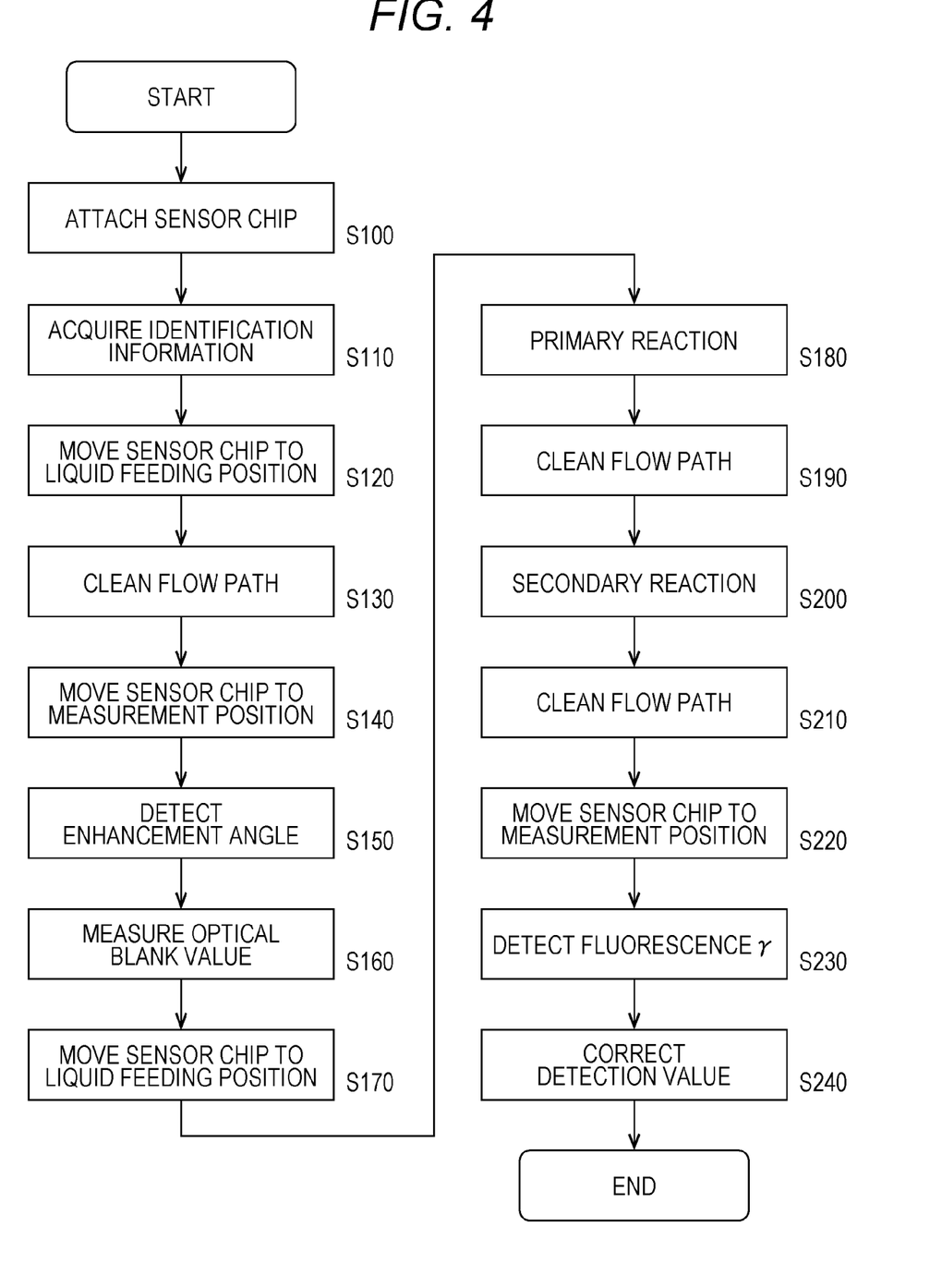
FIG. 4 is a flowchart illustrating an example of an operation procedure of the SPFS device of FIG. 1.

As illustrated below, the controller 12 controls the specimen detectors 10A, 10B, and 10C to detect a specimen included in the sensor chip 100. FIG. 4 is a flowchart illustrating an example of an operation procedure of the specimen detector 10A.

Note that in the present embodiment, a case where the identification information storage 118 of the sensor chip 100 is a barcode and the identification information acquisitor 18 is a barcode reader will be exemplified.

First, a user attaches the sensor chip 100 to the chip holder 54 of the conveying unit 50 (S100).

By operating the identification information acquisitor 18, the controller 12 acquires identification information stored in the identification information storage 118 of the sensor chip 100 attached to the chip holder 54, and stores the identification information in the controller 12 (S110).

By operating the conveying stage 52, the controller 12 moves the sensor chip 100 attached to the chip holder 54 to a liquid feeding position (S120).

Subsequently, by operating the liquid feeding unit 40, the controller 12 introduces a cleaning liquid stored in a liquid reservoir (not illustrated) into the flow path 112, cleans the flow path 112, and removes a stored reagent in the flow path 112 (S130). The cleaning liquid used for cleaning is discharged by the liquid feeding unit 40, and instead, a measurement liquid stored in a liquid reservoir (not illustrated) is introduced into the flow path 112. Note that if there is no influence on a result of detecting an enhancement angle in a subsequent step (S150), the enhancement angle can be measured as it is without discharging the cleaning liquid using the stored reagent cleaning liquid and the measurement liquid together.

Subsequently, by operating the conveying stage 52, the controller 12 conveys the sensor chip 100 attached to the chip holder 54 to a measurement position (S140). Then, by operating the excitation light irradiation unit 20 and the fluorescence detection unit 30, the controller 12 irradiates the sensor chip 100 with the excitation light α, and detects plasmon scattered light having the same wavelength as the excitation light α to detect an enhancement angle (S150).

Specifically, by operating the excitation light irradiation unit 20, the controller 12 performs scanning for an incident angle of the excitation light α with respect to the metal film 104, and by operating the fluorescence detection unit 30, the controller 12 detects plasmon scattered light. At this time, by operating the position switching mechanism 37, the controller 12 disposes the optical filter 33 outside the optical path of the light receiving unit 31. Then, the controller 12 determines the incident angle of the excitation light α when the light quantity of plasmon scattered light is maximum as an enhancement angle.

Subsequently, by operating the excitation light irradiation unit 20 and the fluorescence detection unit 30, the controller 12 irradiates the sensor chip 100 disposed at the measurement position with the excitation light α, and records an output value (optical blank value) of the light receiving sensor 35 (S160).

At this time, by operating the angle adjusting mechanism 22, the controller 12 sets the incident angle of the excitation light α to an enhancement angle. In addition, by operating the position switching mechanism 37, the controller 12 disposes the optical filter 33 in an optical path of the light receiving unit 31.

Subsequently, by operating the conveying stage 52, the controller 12 moves the sensor chip 100 to a liquid feeding position (S170).

Then, by operating the liquid feeding unit 40, the controller 12 discharges a measurement liquid in the flow path 112 and introduces a sample liquid stored in a liquid reservoir (not illustrated) into the flow path 112. In the flow path 112, an analyte is captured by the reaction field on the metal film 104 by an antigen-antibody reaction (primary reaction) (S180).

Note that the sample liquid used here is a liquid prepared using a specimen, and examples thereof include a liquid obtained by mixing a specimen and a reagent and subjecting the resulting mixture to a treatment for bonding a fluorescent substance to an analyte contained in the specimen. Examples of such a specimen include blood, serum, plasma, urine, nasal fluid, saliva, stool, and body cavity fluid (spinal fluid, ascites, and pleural effusion).

Examples of the analyte contained in the specimen include a nucleic acid (DNA, RNA, a polynucleotide, an oligonucleotide, or a peptide nucleic acid (PNA), which may be single-stranded or double-stranded, a nucleoside, a nucleotide, and modified molecules thereof), a protein (a polypeptide or an oligopeptide), an amino acid (including a modified amino acid), a carbohydrate (an oligosaccharide, a polysaccharide, or a sugar chain), a lipid, modified molecules thereof, and complexes thereof. Specifically, the analyte contained in the specimen may be a carcinoembryonic antigen such as α-fetoprotein (AFP), a tumor marker, a signal transduction substance, a hormone, or the like, and is not particularly limited.

Thereafter, the sample liquid in the flow path 112 is removed, and the inside of the flow path 112 is cleaned with a cleaning liquid (S190).

Subsequently, by operating the liquid feeding unit 40, the controller 12 introduces a labeling liquid stored in a liquid reservoir (not illustrated) into the flow path 112. In the flow path 112, the analyte captured onto the metal film 104 is labeled with a fluorescent substance by an antigen-antibody reaction (secondary reaction) (S200). Note that a liquid containing a secondary antibody labeled with a fluorescent substance can be used as the labeling liquid. Thereafter, the labeling liquid in the flow path 112 is removed, the inside of the flow path 112 is cleaned with a cleaning liquid, and the cleaning liquid is removed. Thereafter, a measurement liquid is introduced into the flow path 112 (S210).

Subsequently, by operating the conveying stage 52, the controller 12 moves the sensor chip 100 to a measurement position (S220).

Subsequently, by operating the excitation light irradiation unit 20 and the fluorescence detection unit 30, the controller 12 irradiates the sensor chip 100 disposed at the measurement position with the excitation light α, and detects the fluorescence γ emitted from a fluorescent substance for labelling the analyte captured by the ligand (S230).

The controller 12 can convert the detected fluorescence γ into the amount of the analyte and the concentration thereof as necessary.

At this time, the controller 12 calculates an individual difference correction value for each of the specimen detectors 10A, 10B, and 10C on the basis of individual difference information differing depending on the optical system of each of the 10A, 10B, and 10C, and fluorescent substance information indicating a correction coefficient for each sensor chip and differing depending on a fluorescent substance for labelling an analyte, and corrects the intensity (detection value) of the fluorescence γ detected by each of the specimen detectors 10A, 10B, and 10C on the basis of the individual difference correction value (S240).

The individual difference information is obtained when the SPFS device 10 is manufactured, and is stored in advance in the individual difference information storage 14 of the controller 12. The individual difference information includes information regarding the wavelength of excitation light emitted from the excitation light irradiation unit 20 (a reference wavelength or excitation light wavelength individual difference information such as the excitation light wavelength of each of the specimen detectors 10A, 10B, and 10C), and information regarding the wavelength band of fluorescence that passes through the optical filter 33 of the light receiving unit 31 (a reference wavelength or wavelength individual difference information of the optical filter 33 of each of the specimen detectors 10A, 10B, and 10C).

The individual difference information is obtained when the SPFS device 10 is manufactured, and is stored in advance in the individual difference information storage 14 of the controller 12. The individual difference information includes information regarding the wavelength of excitation light emitted from the excitation light irradiation unit 20 (a reference wavelength or excitation light wavelength individual difference information such as the excitation light wavelength of each of the specimen detectors 10A, 10B, and 10C), and information regarding the wavelength band of fluorescence that the optical filter 33 of the light receiving unit 31 passes through (a reference wavelength or wavelength individual difference information of the optical filter 33 of each of the specimen detectors 10A, 10B, and 10C).

Note that when the SPFS device 10 includes the plurality of specimen detectors 10A, 10B, and 10C as in the present embodiment, the individual difference information storage 14 of the controller 12 stores individual difference information for each of the specimen detectors.

The fluorescent substance information is information differing depending on the type of fluorescent dye, and information regarding a change ratio of an absorption coefficient with respect to a wavelength individual difference of the excitation light (for example, how much the absorption coefficient differs in terms of % when a wavelength is shifted by 1 nm), and a change ratio of the light quantity of fluorescence with respect to a wavelength individual difference of the optical filter 33 (for example, how much a detection value differs in terms of % when a wavelength is shifted by 1 nm).

In the present embodiment, a plurality of pieces of fluorescent substance information is stored in advance in a fluorescent substance information storage 16 (correction coefficient storage) of the controller 12 in association with identification information. On the basis of the identification information acquired by the identification information acquisitor 18, the controller 12 selects fluorescent substance information regarding a fluorescent substance included in the sensor chip 100 from the fluorescent substance information storage 16.

With such a configuration, the fluorescent substance information storage 16 only needs to store information for the number of types of fluorescent substances that is smaller than the number of types of test items. Therefore, it is not necessary to store such a large amount of information for storing a separate piece of information for each test item, and a means having a small storage capacity can be used. Even when a new test item is added, if a fluorescent substance used is the same as an already registered fluorescent substance, it is not necessary to store additional information. Only when a new fluorescent substance is adopted, it is only necessary to store new fluorescent substance information in the fluorescent substance information storage 16 in association with identification information, for example, a fluorescent substance information file to be newly provided is installed in the fluorescent substance information storage 16.

Meanwhile, the fluorescent substance information may be stored in the identification information storage 118 disposed in the sensor chip 100 and may be acquired by the identification information acquisitor 18 for each test of the sensor chip 100.

With such a configuration, it is not necessary to dispose the fluorescent substance information storage 16 of the controller 12. In addition, since it is not necessary to store the fluorescent substance information in advance in the controller 12, it is possible to easily cope with a new test item.

A method for storing the fluorescent substance information in the fluorescent substance information storage 16 of the controller 12 and a method for storing the fluorescent substance information in the identification information storage 118 of the sensor chip 100 can be used in combination.

That is, when only the identification information is stored in the identification information storage 118 of the sensor chip 100, the fluorescent substance information corresponding to the identification information is selected from the fluorescent substance information storage 16 of the controller 12 and used for correction. Meanwhile, when the fluorescent substance information is stored in the identification information storage 118 of the sensor chip 100, the fluorescent substance information can be calibrated so as to be used for correction.

Hereinafter, a method for correcting a detection value using the individual difference information and the fluorescent substance information will be specifically described.

The individual difference information storage 14 of the controller 12 stores information regarding the wavelength of excitation light as individual difference information. The wavelength stored here is a peak wavelength at which the intensity of excitation light is maximum. A reference wavelength $\lambda$ of excitation light, an excitation light wavelength $\lambda_A$ of the specimen detector 10A, an excitation light wavelength $\lambda_B$ of the specimen detector 10B, and an excitation light wavelength $\lambda_C$ of the specimen detector 10C are stored.

The fluorescent substance information storage 16 of the controller 12 stores an excitation light wavelength sensitivity coefficient $\alpha_X$ of fluorescent substance X and an excitation light wavelength sensitivity coefficient $\alpha_Y$ of fluorescent substance Y as fluorescent substance information.

Here, the excitation light wavelength sensitivity coefficient is a value representing how much a detection value differs in terms of % when an excitation light wavelength is shifted by 1 nm.

Figure 5:
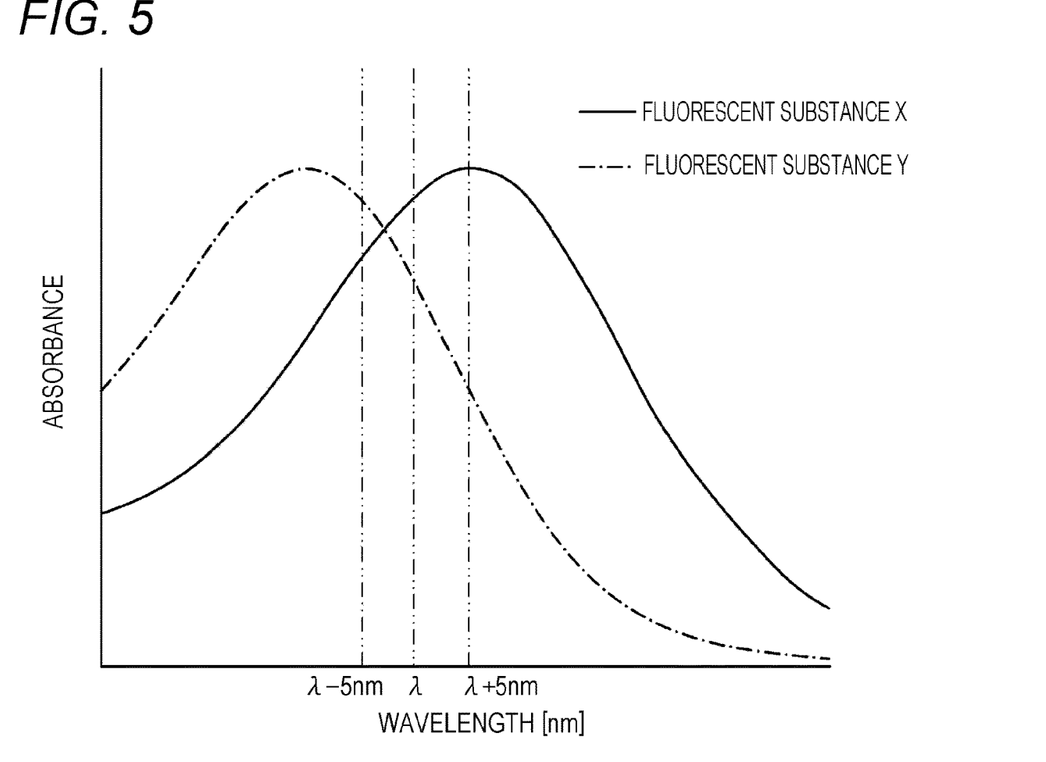
FIG. 5 is a graph illustrating examples of absorption spectra of fluorescent substance X and fluorescent substance Y.

For example, when the absorption spectrum of each of fluorescent substance X and fluorescent substance Y has the characteristics illustrated in FIG. 5, the slope of the absorption spectrum near the reference wavelength $\lambda$, for example, the reference wavelength $\lambda \pm 5$ nm is the excitation light wavelength sensitivity coefficient.

At this time, the detection value S is corrected as illustrated in the following formula (1).

[Numerical formula 1]

$$\text{Corrected detection value } S_\alpha = \left[1 - \frac{\alpha_m}{100} \times (\lambda_n - \lambda)\right] \times S \quad (1)$$

Here, m represents either X or Y, and n represents any one of A, B, and C.

The individual difference information storage 14 of the controller 12 stores information regarding the transmission wavelength band of the optical filter 33 as individual difference information. The transmission wavelength band is generally represented by two wavelengths of a short wavelength side wavelength $L_s$ and a long wavelength side wavelength $L_l$, such as $L_s$ nm to $L_l$ nm. Here, focusing on the short wavelength side wavelength $L_s$ out of the two wavelengths, a reference wavelength Λ of the optical filter 33, a transmission band wavelength $Λ_A$ of the optical filter 33 of the specimen detector A, a transmission band wavelength $Λ_B$ of the optical filter 33 of the specimen detector B, and a transmission band wavelength $Λ_C$ of the optical filter 33 of the specimen detector C are stored.

Figure 6:
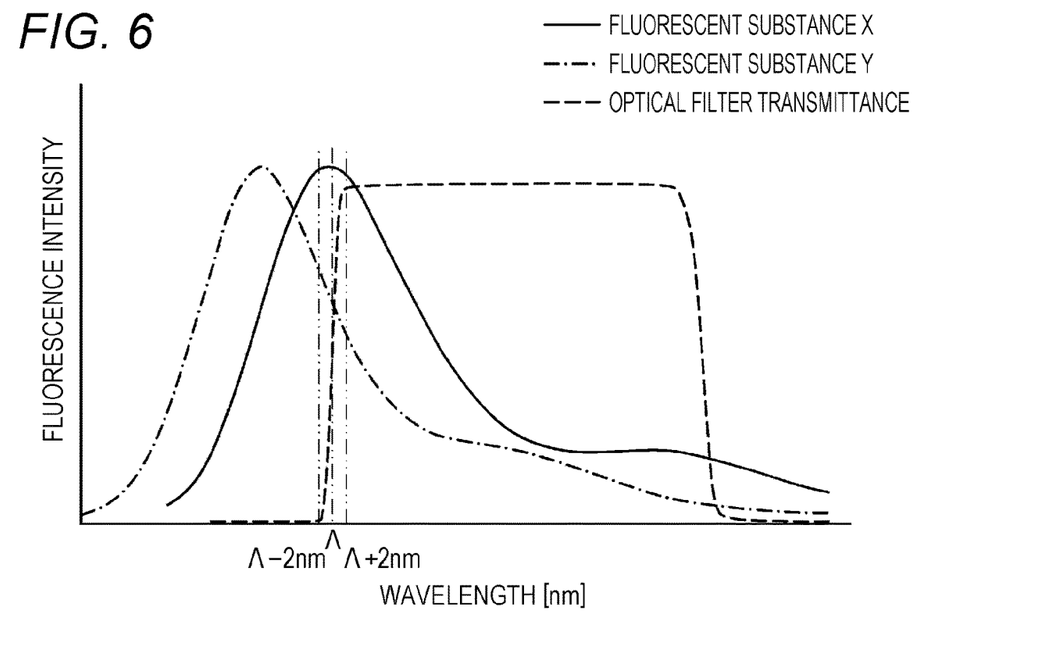
FIG. 6 is a graph illustrating examples of emission spectra of fluorescent substance X and fluorescent substance Y and the transmittance of an optical filter with respect to a wavelength.

Note that in the present embodiment, when the transmission spectrum of the optical filter 33 has characteristics as illustrated in FIG. 6, a wavelength at which the transmittance is 50% is defined as the transmission band wavelength of the optical filter. However, a wavelength at which the transmittance is an arbitrary transmittance, such as a wavelength at which the transmittance is 20% or a wavelength at which the transmittance is 80%, may be defined as the transmission band wavelength.

As illustrated in FIG. 6, considering an overlap between the fluorescence spectrum and the transmission spectrum of the optical filter 33, the short wavelength side wavelength $L_s$ in the transmission wavelength band is a region where the fluorescence intensity is strong. Therefore, fluctuation of a detection value is large even with a small wavelength individual difference. Therefore, a detection value is corrected by storing a transmission band wavelength corresponding to the short wavelength side wavelength $L_s$ in the transmission wavelength band.

Of course, a value to be stored is doubled. However, by storing the reference wavelength Λ and the transmission band wavelength of each optical filter and performing correction for both the short wavelength side wavelength $L_s$ and the long wavelength side wavelength $L_l$ in the transmission wavelength band, a corrected detection value can be calculated more accurately.

The fluorescent substance information storage 16 of the controller 12 stores a filter wavelength sensitivity coefficient $β_X$ of fluorescent substance X and a filter wavelength sensitivity coefficient $β_Y$ of fluorescent substance Y as fluorescent substance information.

Here, the filter wavelength sensitivity coefficient is a value representing how much a detection value differs in terms of % when a cut wavelength of the optical filter 33 is shifted by 1 nm.

For example, when the emission spectrum of each of fluorescent substance X and fluorescent substance Y and the transmittance of the optical filter 33 with respect to a wavelength have characteristics as illustrated in FIG. 6, a detection value is represented by the amount of transmission light that has passed through the optical filter 33, that is, an integral value (area) obtained by multiplying the emission spectrum by the transmittance of the optical filter 33. When the transmission band wavelength of the optical filter 33 changes near Λ, for example, in a range of Λ±2 nm, a change ratio of the light quantity of fluorescence that passes through the optical filter 33 (change ratio of the integrated value (area)) is the filter wavelength sensitivity coefficient.

At this time, a detection value S is corrected as illustrated in the following formula (2).

[Numerical formula 2]

$$\text{Corrected detection value } S_β = \left[1 - \frac{β_m}{100} \times (Λ_n - Λ)\right] \times S \quad (2)$$

Here, m represents either X or Y, and n represents any one of A, B, and C.

Usually, both correction based on an individual difference between the excitation light irradiation units 20 and correction based on an individual difference between the optical filters 33 need to be performed. Therefore, the detection value S is corrected as illustrated in the following formula (3), and a corrected detection value $S_C$ is calculated.

[Numerical formula 3]

$$\text{Corrected detection value } S_C = \\ \left[1 - \frac{α_m}{100} \times (λ_n - λ)\right] \times \left[1 - \frac{β_m}{100} \times (Λ_n - Λ)\right] \times S \quad (3)$$

By the above procedure, presence of an analyte or the amount thereof in a sample liquid can be detected on the basis of the calculated corrected detection value $S_c$.

Hereinafter, an embodiment using more specific numerical values will be described.

Table 1 below illustrates individual difference information for each of the specimen detectors 10A, 10B, and 10C.

TABLE 1

| Specimen detector | Excitation light wavelength | | Transmission band wavelength of optical filter | |
|---|---|---|---|---|
| 10A | $λ_A$ | 660.3 nm | $Λ_A$ | 684.2 nm |
| 10B | $λ_B$ | 661.0 nm | $Λ_B$ | 685.3 nm |
| 10C | $λ_C$ | 659.5 nm | $Λ_C$ | 686.1 nm |
| Reference wavelength | λ | 660.0 nm | Λ | 685.0 nm |

Table 2 below illustrates a correction coefficient for each sensor chip (for each test item).

TABLE 2

| Test item | Fluorescent substance | Excitation light wavelength sensitivity coefficient | | Filter wavelength sensitivity coefficient | |
|---|---|---|---|---|---|
| Test item 1 | X | $α_X$ | +1.2 | $β_X$ | −2.2 |
| Test item 2 | X | $α_X$ | +1.2 | $β_X$ | −2.2 |
| Test item 3 | Y | $α_Y$ | −4.0 | $β_Y$ | −2.8 |
| Test item 4 | Y | $α_Y$ | −4.0 | $β_Y$ | −2.8 |
| Test item 5 | Y | $α_Y$ | −4.0 | $β_Y$ | −2.8 |

When the specimen detector 10A performs a test of test item 1, a correction coefficient is 0.979 as described below.

[Numerical formula 4]

$$\left(1 - \frac{1.2}{100} \times (660.3 - 660.0)\right) \times \left(1 + \frac{2.2}{100} \times (684.2 - 685.0)\right) ≈ 0.979$$

Similarly, when the specimen detector 10C performs a test of test item 1, a correction coefficient is 1.030, when the specimen detector 10A performs a test of test item 3, a correction coefficient is 0.989, and when the specimen detector 10C performs a test of test item 3, a correction coefficient is 1.010.

That is, a fact that the correction coefficients are different in this way means that an influence of an individual difference between specimen detectors is about 5% between the specimen detector 10A and the specimen detector 10C for the same test of test item 1.

An influence of an individual difference between specimen detectors is about 2% between the specimen detector 10A and the specimen detector 10C for the test of the test item 3. This means that an influence of an individual difference between specimen detectors is different even with the same specimen detector when different test items (fluorescent substances) are used.

Conventionally, in order to reduce an individual difference between specimen detectors, calibration work has been performed in all test items for all specimen detectors, and correction coefficients have been acquired and stored. However, in the present invention, only by acquiring and storing wavelength information of each specimen detector and a correction coefficient for each fluorescent substance, it is possible to perform correction to reduce individual differences for a plurality of test items.

Specifically, conventionally, it is necessary to acquire and store 15 correction coefficients for five test items for three specimen detectors, whereas in the present embodiment, it is only necessary to store twelve correction coefficients in total including eight pieces of individual difference information for the specimen detectors and four correction coefficients for the respective sensor chips. Furthermore, as the number of specimen detectors and the number of test items increase, the present invention can reduce a numerical value to be stored relative to a conventional one.

Note that in the present embodiment, an enhancement angle is detected (S140) and an optical blank value is measured (S150) before a primary reaction (S170). However, an enhancement angle may be detected (S140) and an optical blank value may be measured (S150) after the primary reaction (S170).

When the incident angle of the excitation light α is determined in advance, the detection of an enhancement angle (S140) may be omitted.

In the above description, a secondary reaction (S190) for labeling an analyte with a fluorescent substance is performed after a primary reaction (S170) for reacting the analyte with a ligand (two-step method). However, the timing for labeling an analyte with a fluorescent substance is not particularly limited.

For example, before a sample liquid is introduced into the flow path 112, a labeling liquid can be added to the sample liquid to label an analyte with a fluorescent substance in advance. By simultaneously injecting the sample liquid and the labeling liquid into the flow path 112, an analyte labeled with a fluorescent substance is captured by a ligand. In this case, the analyte is labeled with the fluorescent substance, and the analyte is captured by the ligand.

In either case, both the primary reaction and the secondary reaction can be completed by introducing the sample liquid into the flow path 112 (one-step method). In this way, when the one-step method is adopted, an enhancement angle is detected (S140) before an antigen-antibody reaction.

The preferable embodiment of the present invention has been described above, but the present invention is not limited thereto. For example, in the above embodiment, one SPFS device 10 includes a plurality of specimen detectors 10A, 10B, and 10C. However, one SPFS device 10 may include only one specimen detector.

It goes without saying that the present invention can be applied not only to correction of an individual difference between specimen detectors included in one SPFS device 10, but also to correction of an individual difference between a plurality of SPFS devices.

Note that when the test item is limited to one, a corrected detection value may be calculated without disposing the identification information acquisitor by correcting a detection value on the basis of individual difference information and fluorescent substance information stored in advance in the controller 12.

Furthermore, the SPFS device has been described in the above embodiment. However, the specimen detection device according to the present invention can be variously modified without departing from the object of the present invention, for example, the specimen detection device according to the present invention can also be applied to a specimen detection device using fluorescence immunoassay (FIA), such as an SPR device.

REFERENCE SIGNS LIST

10 SPFS device
10A Specimen detector
10B Specimen detector
10C Specimen detector
12 Controller
14 Individual difference information storage
16 Fluorescent substance information storage
18 Identification information acquisitor
20 Excitation light irradiation unit
21 Light source unit
22 Angle adjusting mechanism
23 Light source controller
30 Fluorescence detection unit
31 Light receiving unit
32 First lens
33 Optical filter
34 Second lens
35 Light receiving sensor
37 Position switching mechanism
38 Sensor controller
40 Liquid feeding unit
41 Syringe pump
42 Syringe
43 Plunger
44 Liquid feeding pump drive mechanism
45 Pipette tip
46 Pipette nozzle
50 Conveying unit
52 Conveying stage
54 Chip holder
100 Sensor chip
102 Dielectric member
102a Incident surface
102b Film formation surface
102c Emission surface
104 Metal film
106 Flow path forming member
110a Through hole
110b Through hole
111 Multilayer film
112 Flow path
114 Flow path seal
116 Reaction field
118 Identification information storage
120 Lid seal

The invention claimed is:

1. A specimen detection device for detecting an analyte labeled with a fluorescent substance by determining an intensity of fluorescence, the fluorescence being emitted from the fluorescent substance by irradiating a sensor chip including the analyte with excitation light, the specimen detection device comprising:

a specimen detector including an excitation light irradiation unit for emitting the excitation light and a fluorescence detection unit for detecting the fluorescence; and a controller programmed to detect the analyte by determining a detection value derived from the intensity of the fluorescence detected by the fluorescence detection unit, wherein the controller is programmed to correct the detection value using an individual difference information stored in advance for the specimen detector and a correction coefficient for the sensor chip, and calculate a corrected detection value, the correction coefficient for the sensor chip is fluorescent substance information differing depending on the fluorescent substance, and the fluorescent substance information is a change ratio of an absorption coefficient with respect to a wavelength individual difference of the excitation light, or a change ratio of a light quantity of the fluorescence with respect to a wavelength individual difference of an optical filter of the fluorescence detection unit.

2. The specimen detection device according to claim 1, wherein the individual difference information includes a wavelength of excitation light emitted by the excitation light irradiation unit.

3. The specimen detection device according to claim 2, wherein the fluorescence detection unit includes the optical filter, and the individual difference information includes transmission wavelength band information of the optical filter.

4. The specimen detection device according to claim 2, further comprising an identification information acquisitor for acquiring identification information stored in an identification information storage disposed in the sensor chip, wherein the controller is programmed to determine the correction coefficient for the sensor chip based on the identification information acquired by the identification information acquisitor.

5. The specimen detection device according to claim 2, further comprising one or more other specimen detectors, wherein the controller is programmed to store the individual difference information for each of the specimen detectors.

6. The specimen detection device according to claim 2, wherein the sensor chip includes:

a dielectric member;

a metal film adjacent to an upper surface of the dielectric member;

a reaction field adjacent to an upper surface of the metal film; and a liquid holding member disposed on an upper surface of the reaction field, and the excitation light irradiation unit irradiates the metal film with the excitation light through the dielectric member, and the fluorescence detection unit detects the fluorescence generated by the analyte captured by the reaction field and labeled with the fluorescence using the excitation light with which the metal film has been irradiated.

7. The specimen detection device according to claim 1, wherein the fluorescence detection unit includes the optical filter, and the individual difference information includes transmission wavelength band information of the optical filter.

8. The specimen detection device according to claim 7, further comprising an identification information acquisitor for acquiring identification information stored in an identification information storage disposed in the sensor chip, wherein the controller is programmed to determine the correction coefficient for the sensor chip based on the identification information acquired by the identification information acquisitor.

9. The specimen detection device according to claim 7, further comprising one or more other specimen detectors, wherein the controller is programmed to store the individual difference information for each of the specimen detectors.

10. The specimen detection device according to claim 7, wherein the sensor chip includes:

a dielectric member;

a metal film adjacent to an upper surface of the dielectric member;

a reaction field adjacent to an upper surface of the metal film; and a liquid holding member disposed on an upper surface of the reaction field, and the excitation light irradiation unit irradiates the metal film with the excitation light through the dielectric member, and the fluorescence detection unit detects the fluorescence generated by the analyte captured by the reaction field and labeled with the fluorescence using the excitation light with which the metal film has been irradiated.

11. The specimen detection device according to claim 1, further comprising an identification information acquisitor for acquiring identification information stored in an identification information storage disposed in the sensor chip, wherein the controller is programmed to determine the correction coefficient for the sensor chip based on the identification information acquired by the identification information acquisitor.

12. The specimen detection device according to claim 11, wherein the controller includes a correction coefficient storage and is programmed to store the correction coefficient for the sensor chip in association with the identification information, and the controller is programmed to select a corresponding correction coefficient from the correction coefficient storage based on the identification information acquired by the identification information acquisitor.

13. The specimen detection device according to claim 11, wherein the identification information storage stores the correction coefficient for the sensor chip, and the controller is programmed to correct the detection value using the correction coefficient acquired by the identification information acquisitor and stored in the identification information storage, and calculate the corrected detection value.

14. The specimen detection device according to claim 1, further comprising
one or more other specimen detectors, wherein
the controller is programmed to store the individual difference information for each of the specimen detectors.

15. The specimen detection device according to claim 1, wherein
the sensor chip includes:
a dielectric member;
a metal film adjacent to an upper surface of the dielectric member;
a reaction field adjacent to an upper surface of the metal film; and
a liquid holding member disposed on an upper surface of the reaction field, and
the excitation light irradiation unit irradiates the metal film with the excitation light through the dielectric member, and the fluorescence detection unit detects the fluorescence generated by the analyte captured by the reaction field and labeled with the fluorescence using the excitation light with which the metal film has been irradiated.

16. A specimen detection method for detecting fluorescence emitted from a fluorescent substance by a fluorescence detection unit for detecting the fluorescence by irradiating a sensor chip including an analyte labeled with the fluorescent substance with excitation light from an excitation light irradiation unit for emitting the excitation light using a specimen detector including the excitation light irradiation unit and the fluorescence detection unit, and detecting the analyte by determining a detection value depending on an intensity of the detected fluorescence, wherein
a corrected detection value is calculated by correcting the detection value using an individual difference information acquired in advance for the specimen detector and a correction coefficient for the sensor chip,
the correction coefficient for the sensor chip is fluorescent substance information differing depending on the fluorescent substance, and
the fluorescent substance information is a change ratio of an absorption coefficient with respect to a wavelength individual difference of the excitation light, or a change ratio of a light quantity of the fluorescence with respect to a wavelength individual difference of an optical filter of the fluorescence detection unit.

* * * * *